US005786769A

United States Patent [19]

Coteus et al.

[11] Patent Number: 5,786,769
[45] Date of Patent: Jul. 28, 1998

[54] METHOD AND SYSTEM FOR DETECTING THE PRESENCE OF ADAPTER CARDS

[75] Inventors: Paul William Coteus, Yorktown Heights, N.Y.; Daniel Willaim John Johnson, Round Rock, Tex.

[73] Assignee: International Business Machines Corporation, Armonk, N.Y.

[21] Appl. No.: 766,545

[22] Filed: Dec. 11, 1996

[51] Int. Cl.[6] .................................................. G08B 21/00
[52] U.S. Cl. .......................... 340/687; 340/635; 395/427; 395/442; 364/243; 364/244.5; 364/245; 364/246.7
[58] Field of Search .................................. 340/687, 635; 395/425, 427, 575, 442, 497.01; 364/243, 244.2, 244.5, 245, 246.7, 969.1, DIG. 1, DIG. 2

[56] References Cited

U.S. PATENT DOCUMENTS

| | | | |
|---|---|---|---|
| 5,241,643 | 8/1993 | Durkin et al | 395/425 |
| 5,253,357 | 10/1993 | Allen et al. | 395/425 |
| 5,423,028 | 6/1995 | Schieve et al. | 395/575 |
| 5,446,860 | 8/1995 | Dresser et al. | 395/427 |
| 5,526,320 | 6/1996 | Zagar et al. | 365/233.5 |
| 5,539,912 | 7/1996 | Clarke, Jr. et al. | 395/800 |
| 5,621,678 | 4/1997 | Barnaby et al. | 365/52 |

*Primary Examiner*—Jeffery Hofsass
*Assistant Examiner*—Nina Tong
*Attorney, Agent, or Firm*—Richard A. Henkler

[57] ABSTRACT

A method and apparatus for detecting the presence/absence of adapter cards such as memory modules and alike. The method and apparatus utilize adapter cards which have wrap around pins for coupling grounds thereto. This coupled ground is then used by a Ground Detection Circuit and combined with different signals emanating from the memory modules such that when one or more of the adapter cards are absent, a default value resulting from the absence of ground is used to indicate the missing adapter(s).

8 Claims, 4 Drawing Sheets

1

METHOD AND SYSTEM FOR DETECTING THE PRESENCE OF ADAPTER CARDS

BACKGROUND

1. Field of the Present Invention

In general, the present invention relates to data processing systems, and more particularly, to methods and apparatuses that detect the presence of adapter cards.

2. History of Related Art

In today's ever increasing competitive market for computers, such as personal servers and the like, the endeavor for increased functionality while maintaining control over cost is a never ending conquest.

One area that is ripe for a cost reduction improvement is the circuitry used for detecting the presence or absence of adapter cards, such as adapter cards which contain SIMM Modules. The methods currently used for detecting the presence or absence of an adapter card within the data processing system are often times expensive and complex.

It would, therefore, be a distinct advantage to have a method and apparatus that could detect the presence or absence of adapter cards, having SIMM Modules contained thereon, which would be cost effective. The present invention provides such a method and apparatus.

SUMMARY OF THE PRESENT INVENTION

In one aspect, the present invention is a method of detecting whether memory adapter cards are present in a data processing system. Each of the adapter cards include a plurality of Single In-line Memory Modules (SIMMS)

The method includes the step of creating a direct electrical path from a first pin of at least one adapter to a second pin of the at least one adapter. The method further includes the steps of connecting ground to the first pin, and connecting the ground of at least one ground connection component to the second pin. The method also includes the step of detecting, via the at least one ground detection component, the absence or presence of the at least one adapter.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT OF THE PRESENT INVENTION

Figure 1:
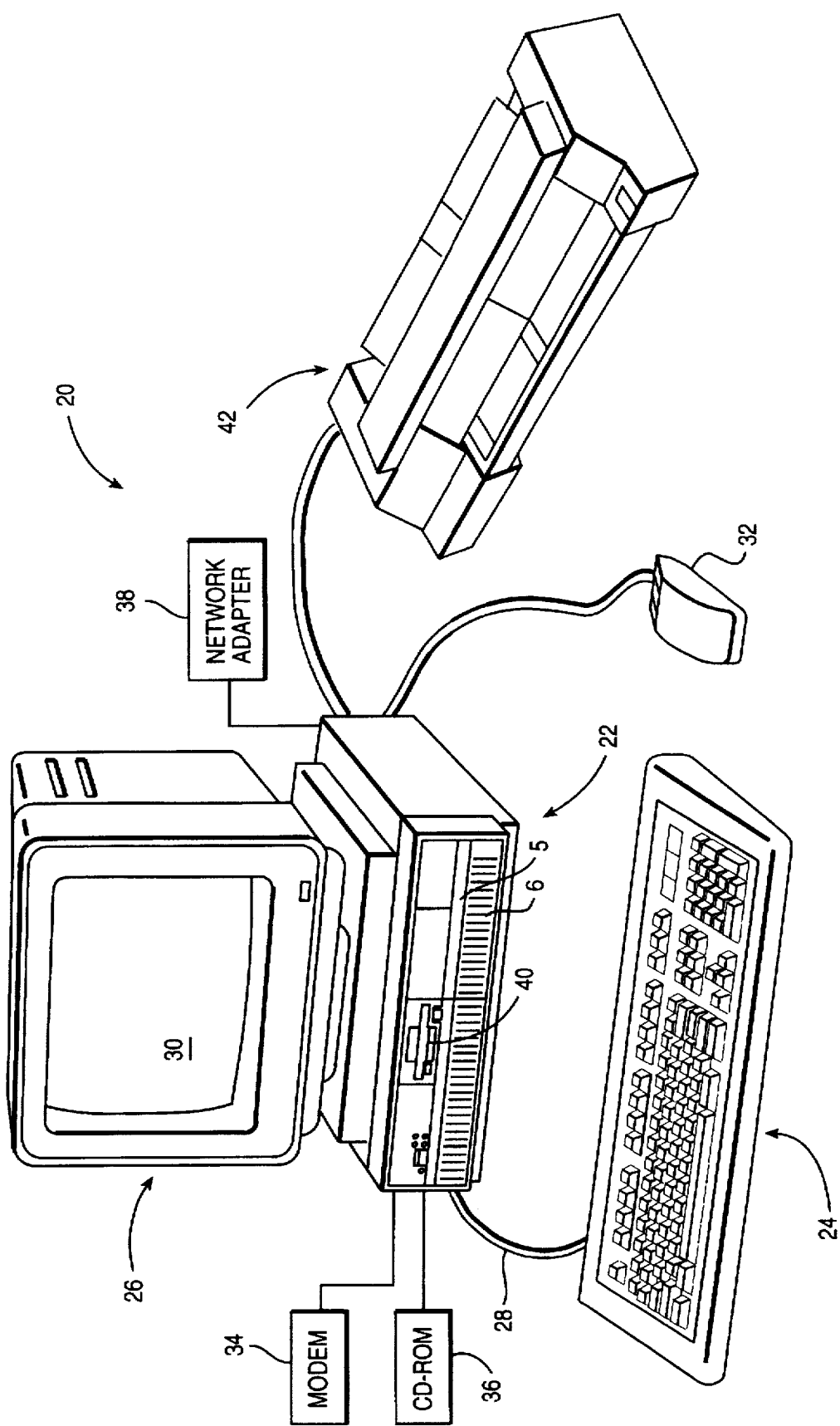
FIG. 1 is a data processing system in which the present invention can be implemented.

Reference now being made to FIG. 1, a data processing system 20 is shown in which the present invention can be implemented. The data processing system 20 includes processor 22, keyboard 24, and display 26. Keyboard 24 is coupled to processor 22 by a cable 28. Display 26 includes display screen 30, which may be implemented using a cather ray tube (CRT) a liquid crystal display (LCD) an electrode luminescent panel or the like. The data processing system 20 also includes pointing device 32, which may be implemented using a track ball, a joy stick, touch sensitive tablet or screen, track path, or as illustrated a mouse. The pointing device 32 may be used to move a pointer or cursor on display screen 30. Processor 22 may also be coupled to one or more peripheral devices such as modem 34, CD-ROM 36, network adapter 38, and floppy disk drive 40, each of which may be internal or external to the enclosure or processor 22. An output device such as printer 42 may also be coupled with processor 22.

It should be noted and recognized by those persons of ordinary skill in the art that display 26, keyboard 24, and pointing device 32 may each be implemented using anyone of several known off-the-shelf components.

Figure 2:
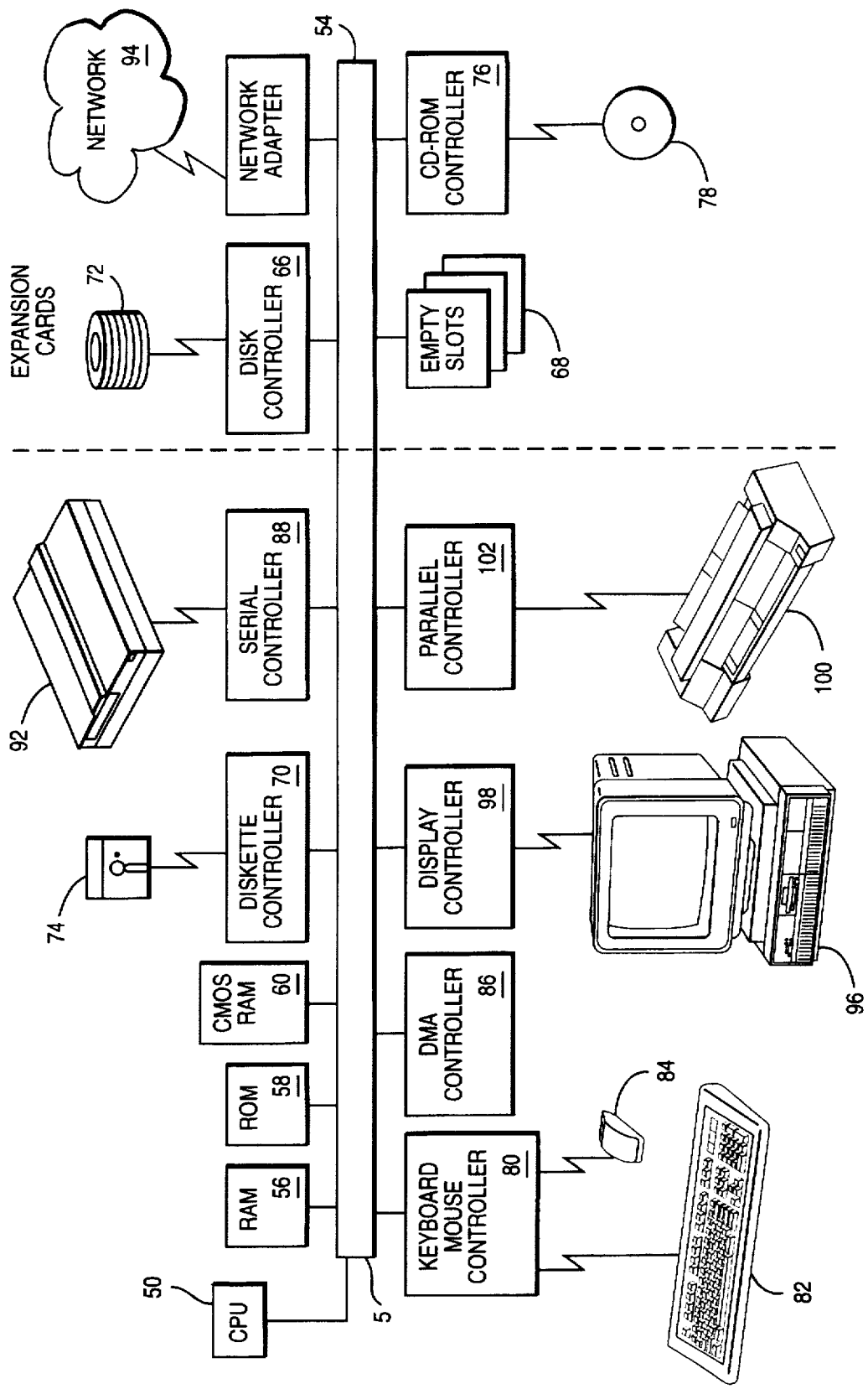
FIG. 2 is a high level block diagram illustrating selected components that can be included in the data processing system of FIG. 1 according to the teachings of the present invention.

Reference now being made to FIG. 2, a high level block diagram is shown illustrating selected components that can be included in the data processing system 20 of FIG. 1 according to the teachings of the present invention. The data processing system 20 is controlled primarily by computer readable instructions, which can be in the form of software, wherever, or by whatever means such software is stored or accessed. Such software may be executed within the Central Processing Unit (CPU) 50 to cause data processing system 20 to do work.

Memory devices coupled to system bus 5 include Random Access Memory (RAM) 56, Read Only Memory (ROM) 58, and non-volatile memory 60. Such memories include circuitry that allows information to be stored and retrieved. ROMs contain stored data that cannot be modified. Data stored in RAM can be changed by CPU 50 or other hardware devices. Non-volatile memory is memory that does not loose data when power is removed from it. Non-volatile memories include ROM, EPROM, flash memory, or battery-pack CMOS RAM. As shown in FIG. 2, such battery-pack CMOS RAM may be used to store configuration information.

An expansion card or board is a circuit board that includes chips and other electronic components connected that adds functions or resources to the computer. Typically expansion cards add memory, disk-drive controllers 66, video support, parallel and serial ports, and internal modems. For lap top, palm top, and other portable computers, expansion cards usually take the form of PC cards, which are credit card-sized devices designed to plug into a slot in the side or back of a computer. An example such a slot is PCMCIA slot (Personal Computer Memory Card International Association) which defines type 1, 2 and 3 card slots. Thus, empty slots 68 may be used to receive various types of expansion cards or PCMCIA cards.

Disk controller 66 and diskette controller 70 both include special purpose integrated circuits and associated circuitry that direct and control reading from and writing to hard disk drive 72, and a floppy disk or diskette 74, respectively. Such disk controllers handle tasks such as positioning read/write head, mediating between the drive and the CPU 50, and controlling the transfer information to and from memory. A single disk controller may be able to control more than one disk drive.

CD-ROM controller 76 may be included in data processing 20 for reading data from CD-ROM 78 (compact disk read only memory). Such CD-ROMs use laser optics rather then magnetic means for reading data.

Keyboard mouse controller 80 is provided in data processing system 20 for interfacing with keyboard 82 and pointing device 84. Such pointing devices are typically used to control an on-screen element, such as a cursor, which may take the form of an arrow having a hot spot that specifies the location of the pointer when the user presses a mouse button. Other pointing devices include the graphics tablet, the stylus, the light pin, the joystick, the puck, the trackball, the trackpad, and the pointing device sold under the trademark "TrackPoint" by IBM.

Communication between processing system 20 and other data processing systems may be facilitated by serial controller 88 and network adapter 90, both of which are coupled to system bus 5. Serial controller 88 is used to transmit information between computers, or between a computer and peripheral devices, one bit at a time over a single line. Serial communications can be synchronous (controlled by some standard such as a clock) or asynchronous (managed by the exchange of control signals that govern the flow of information). Examples of serial communication standards include RS-232 interface and the RS-422 interface. As illustrated, such a serial interface may be used to communicate with modem 92. A modem is a communication device that enables a computer to transmit information over a standard telephone line. Modems convert digital computer signals to interlock signals suitable for communications over telephone lines. Modem 92 can be utilized to connect data processing system 20 to an on-line information service, such as an information service provided under the service mark "PRODIGY" by IBM and Sears. Such on-line service providers may offer software that may be down loaded into data processing system 20 via modem 92. Modem 92 may provide a connection to other sources of software, such as server, an electronic bulletin board, the internet or World Wide Web.

Network adapter 90 may be used to connect data processing system 20 to a local area network 94. Network 94 may provide computer users with means of communicating and transferring software and information electronically. Additionally, network 94 may provide distributed processing, which involves several computers in the sharing of workloads or cooperative efforts in performing a task.

Display 96, which is controlled by display controller 98, is used to display visual output generated by data processing system 20. Such visual output may include text, graphics, animated graphics, and video. Display 96 may be implemented with CRT-based video display, an LCD-based flat panel display, or a gas plasma-based flat-panel display. Display controller 98 includes electronic components required to generate a video signal that is sent to display 96.

Printer 100 may be coupled to data processing system 20 via parallel controller 102. Printer 100 is used to put text or a computer-generated image on paper or on another medium, such as transparency. Other type of printers may include an image setter, a plotter, or a film recorder.

Parallel controller 102 is used to send multiple data and control bits simultaneously over wires connected between system bus 5 and another parallel communication device, such as printer 100.

CPU 50 fetches, decodes, and executes instructions, and transfers information to and from other resources via the computers main data-transfer path, system bus 5. Such a bus connects the components in a data processing system 20 and defines the medium for data exchange. System bus 5 connects together and allows for the exchange of data between memory units 56, 58, and 60, CPU 50, and other devices as shown in FIG. 2.

Figure 3:
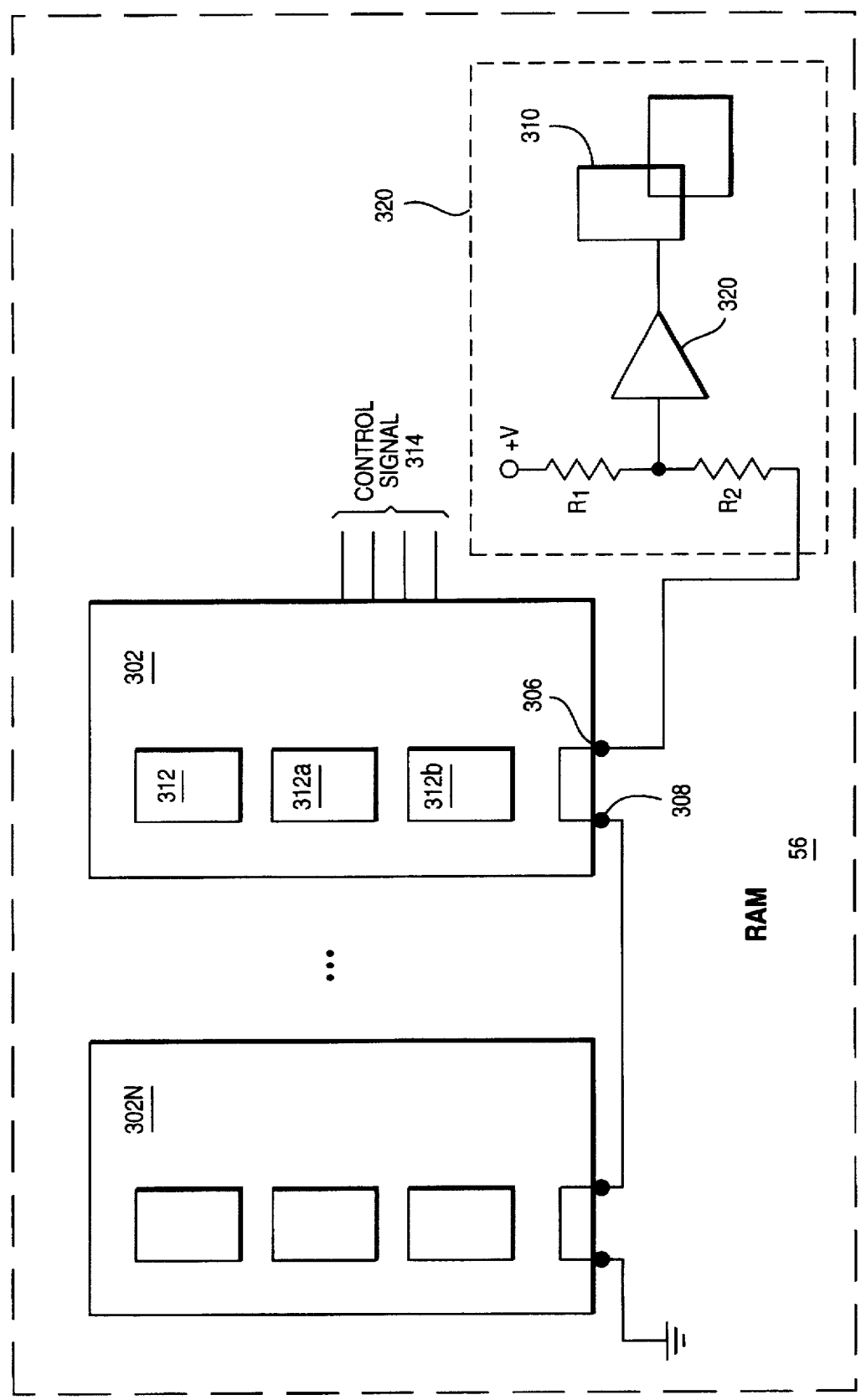
FIG. 3 is a schematic diagram illustrating in greater detail the RAM component of FIG. 2 according to the teachings of the present invention.

Reference now being made to FIG. 3, a schematic diagram is shown illustrating the RAM 56 of FIG. 2 in greater detail according to the teachings of the present invention. RAM 56 includes a plurality of SIMM Modules 302–302n and Ground Detection Circuit 320. Each of the SIMM Modules 302- n include a plurality of SIMMS 312a–b and control signals 314. The control signals 314 are used for communicating information concerning the SIMM Modules card 302- n and SIMMS 312a–b. In the preferred embodiment of the present invention, the SIMM Modules 302- n are of type 20H1563, and are produced by the Celestica Company.

As shown in FIG. 3, each of the SIMM Modules 302- n have two pins 308 and 306 which are wired together (wrapped). These pins 308 and 306 are used for detecting the presence or absence of SIMM Module 302 via a passed though Ground signal. As noted from FIG. 3, if a SIMM Module 302- n is not present, then the Ground for the Ground Detection Circuit 320 is not present. The non-presence of a Ground is detected via the Ground Detection Circuit 320 by using logic to generate a one or a zero. This Logic may be, for example, a chip receiver 308 and Latch 310.

Further, in the performed embodiment of the present invention, the Ground Detection Circuit 320 can also be combined with the control signals 314 to determine whether or not a certain combination of cards is present (e.g. 2, 4, 7, etc.). More specifically, each of the control signals 314 have a individual value which when combined as a whole represents information concerning the status of SIMM Module 302.

Figure 4:
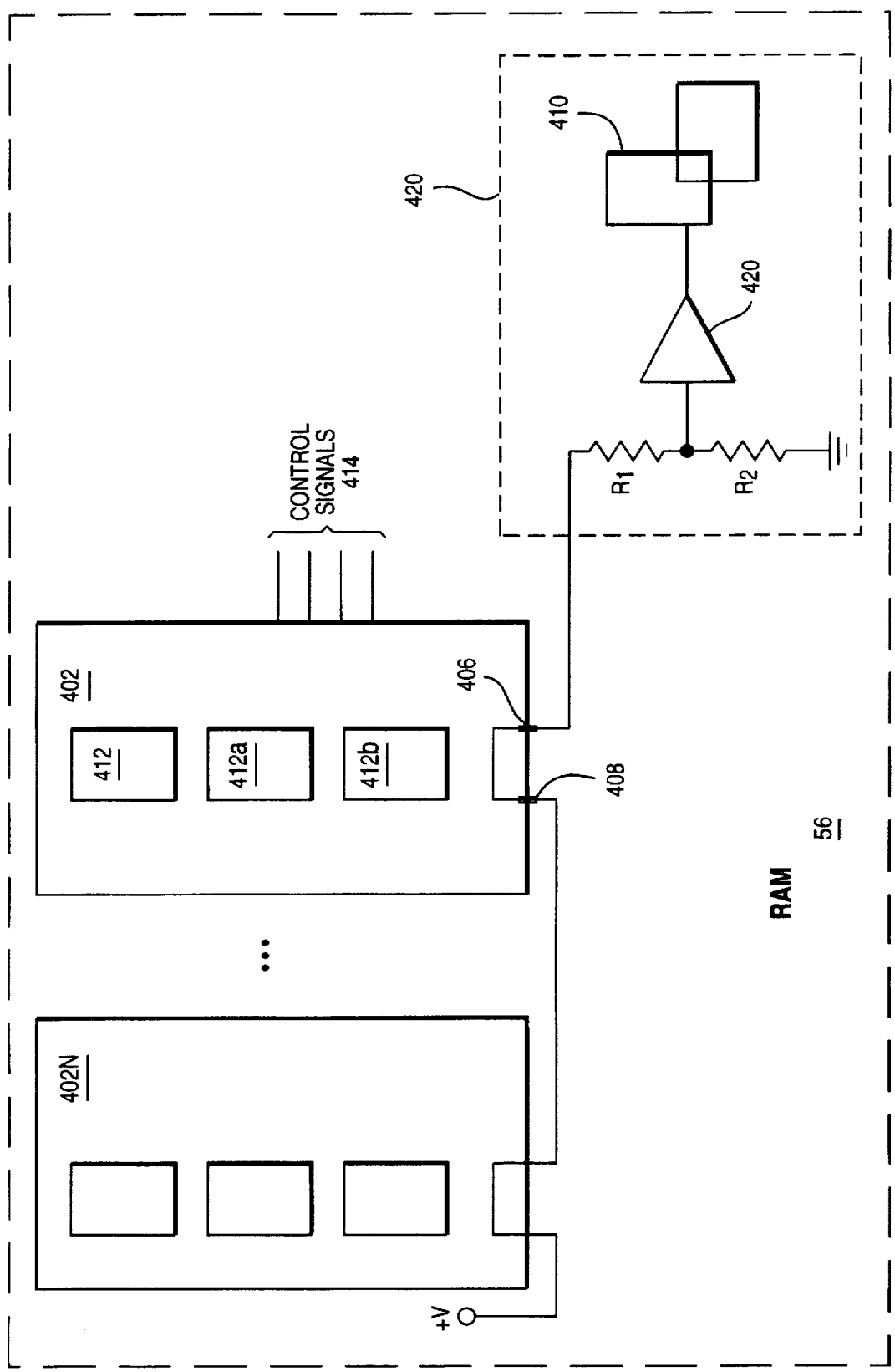
FIG. 4 is a schematic diagram illustrating in greater detail the RAM component of FIG. 2 according to an alternative embodiment of the present invention.

Reference now being made to FIG. 4, a schematic diagram is shown illustrating the RAM 56 of FIG. 2, in greater detail according to an alternative embodiment of the present invention. RAM 56 includes a plurality of SIMM Modules 402- n and Voltage Detection Circuit 420.

Each of the SIMM Modules 402- n include a plurality of SIMMS 412a–b and control signals 414. The control signals 414 are used for communicating information concerning the SIMM Modules 402- n and SIMM Modules 412a–b. As previously explained the SIMM Modules 402- n are of type 20H1563, and are produced by Celestica Company.

As shown in FIG. 4, each of the SIMM Modules 402- n have two pins 408 and 406 which are wired together (wrapped). These pins 408 and 406 are used for detecting the presence or absence of SIMM Modules 402- n via a pass through voltage signal. As noted from FIG. 4, if a SIMM Modules 402- n is not present then the voltage for the Voltage Detection Circuit 420 is not present. The non-presence of a voltage supply is also detected via the the Voltage Detection Circuit 420 by using logic to generate a 1 or 0. This logic may be, for example, a chip receiver 408 and latch 410. Further, in the alternative embodiment of the present invention, the Voltage Detection Circuit 420 can also be combined with a control signals 414 to determine whether or not a certain combination of cards is present (e.g. 2, 4, 7, etc.). More specifically, each of the control signals 414 have an individual value which when combined as a whole represents information concerning the status of the SIMM Module 402.

The signals 414 are typically and internally tied to a voltage such that if a voltage is not present, then all the control signals 414 default to a known value. In the preferred embodiment of the present invention, this default value is represented by all logical zeros.

This default value then can be used for either powering down slots in which the SIMM Modules 402- n reside and/or ignoring all control signals 414 omitted from the Modules 402-n and/or eliminating signals such as a clock to the SIMM Modules 402.

These signals 314 are typically internally tied to Ground such that if Ground is not present, then all of the control signals 314 default to a known value. In the preferred embodiment of the present invention, this default value is represented by all logical ones.

This default value can then be used for either powering down slots in which the SIMM Modules 302-n reside, and/or ignoring all control signals 314 emitted from the modules 302-n and/or eliminating signals such as a clock to the SIMM Module 302.

It is thus believed that the operation and construction of the present invention will be apparent from the foregoing description. While the method and system shown and described has been characterized as being preferred, it will be readily apparent that various changes and/or modifications could be made wherein without departing from the spirit and scope of the present invention as defined in the following claims.

What is claimed is:

1. A method of detecting whether memory adapter cards are present in a data processing system, each adapter card including a plurality of Single In-line Memory Modules (SIMMS), the method comprising the steps of:

creating a direct electrical path from a first pin of at least one adapter to a second pin of the at least one adapter, the at least one adapter including control signals for transmitting data concerning the plurality of SIMMS located thereon, each one of the control signals having a logical value of either high or low;

connecting ground to the first pin;

connecting a ground detection component to each one of the control signals;

connecting the ground pin of each one of the ground detection components to the second pin, each one of the ground detection components emitting a logical value when ground is absent from the ground pin; and detecting the absence of the at least one adapter via a high logical value from the ground detection components.

2. The method of claim 1 wherein each of the ground detection components is a chip receiver and a latch.

3. An apparatus for detecting whether memory adapter cards are present in a data processing system, each adapter card including a plurality of Single In-line Memory Modules (SIMMS), the apparatus comprising:

means for creating a direct electrical path from a first pin of at least one adapter to a second pin of the least one adapter, the at least one adapter including control signals for transmitting data concerning the plurality of SIMMS located thereon, each one of the control signals having a logical value of either high or low;

means for connecting ground to the first pin;

means for connecting a ground detection component to each one of the control signals;

means for connecting the ground pin of each one of the ground detection components to the second pin, each one of the ground detection components emitting a logical value when ground is absent from the ground pin; and means for detecting the absence of the at least one adapter via a high logical value from the ground detection components.

4. The apparatus of claim 3 wherein each of the ground detection components is a chip receiver and a latch.

5. A method of detecting whether memory adapter cards are present in a data processing system, each adapter card including a plurality of Single In-line Memory Modules (SIMMS), the method comprising the steps of:

creating a direct electrical path from a first pin of at least one adapter to a second pin of the at least one adapter, the at least one adapter including control signals for transmitting data concerning the plurality of SIMMS located thereon, each one of the control signals having a logical value of either high or low;

connecting ground to the first pin;

connecting a ground detection component to each one of the control signals;

connecting the ground pin of each one of the ground detection components to the second pin, each one of the ground detection components emitting a logical value when ground is absent from the ground pin; and detecting the presence of the at least one adapter via a low logical value from the ground detection components.

6. The method of claim 5 wherein each of the ground detection components is a chip receiver and a latch.

7. An apparatus for detecting whether memory adapter cards are present in a data processing system, each adapter card including a plurality of Single In-line Memory Modules (SIMMS), the apparatus comprising:

means for creating a direct electrical path from a first pin of at least one adapter to a second pin of the least one adapter, the at least one adapter including control signals for transmitting data concerning the plurality of SIMMS located thereon, each one of the control signals having a logical value of either high or low;

means for connecting ground to the first pin;

means for connecting a ground detection component to each one of the control signals;

means for connecting the ground pin of each one of the ground detection components to the second pin, each one of the ground detection components emitting a logical value when ground is absent from the ground pin; and means for detecting the presence of the at least one adapter via a low logical value from the ground detection components.

8. The apparatus of claim 7 wherein each of the ground detection components is a chip receiver and a latch.

* * * * *